United States Patent
McCorkendale

(10) Patent No.: US 9,298,914 B1
(45) Date of Patent: Mar. 29, 2016

(54) ENTERPRISE DATA ACCESS ANOMALY DETECTION AND FLOW TRACKING

(71) Applicant: Symantec Corporation, Mountain View, CA (US)

(72) Inventor: Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 184 days.

(21) Appl. No.: 14/095,015

(22) Filed: Dec. 3, 2013

(51) Int. Cl.
*G06F 21/55* (2013.01)

(52) U.S. Cl.
CPC .................................. *G06F 21/552* (2013.01)

(58) Field of Classification Search
None
See application file for complete search history.

(56) References Cited

U.S. PATENT DOCUMENTS

| | | | |
|---|---|---|---|
| 6,769,066 B1 * | 7/2004 | Botros et al. | 726/23 |
| 6,839,850 B1 * | 1/2005 | Campbell et al. | 726/23 |
| 2007/0094265 A1 * | 4/2007 | Korkus | 707/9 |
| 2009/0328215 A1 * | 12/2009 | Arzi et al. | 726/23 |

OTHER PUBLICATIONS

Bace et al., Intrusion Detection Systems, NIST, 2001.*
Denning, An Intrusion-Detection Model, IEEE, 1987.*
Snapp et al., A System for Distributed Intrusion Detection, IEEE, 1991.*
Symantec App Center Mobile Application Management and Protection Data Sheet: Mobile Security and Management, 4 pages, May 2013.

* cited by examiner

*Primary Examiner* — Minh Dinh
(74) *Attorney, Agent, or Firm* — Patent Law Works LLP

(57) ABSTRACT

Anomalous access activity is detected and managed. Access of enterprise data on multiple client computers is monitored and logged. The resulting log information identifies accessed units of enterprise data and corresponding access context. Log information concerning access of specific units of data on multiple client computers is received over a period of time and amalgamated. Statistical analysis is performed on amalgamated log information, thereby determining access baselines for data over the time period. Received log information concerning access of a specific unit of data on a specific client computer is compared to corresponding access baseline(s). Responsive to the comparison indicating that the access deviates from a baseline in excess of a threshold, the access is classified as being anomalous. Alerts are automatically output in response to detecting anomalous data access. Reports documenting data access activity on multiple client computers over time are generated, based on amalgamated log information.

19 Claims, 5 Drawing Sheets

ENTERPRISE DATA ACCESS ANOMALY DETECTION AND FLOW TRACKING

TECHNICAL FIELD

This disclosure pertains generally to computer security, and more specifically to automatically tracking the access and flow of an organization's data and detecting anomalous access, thereby protecting against the leakage of proprietary and/or confidential information.

BACKGROUND

The leakage of proprietary and/or confidential data is a continuing problem for organizations such as corporations, governments and universities. Contemporary ubiquitous remote network access to an organization's computers increases productivity and is convenient, but at the same time creates ever greater challenges for protecting the data from being accessed by unauthorized parties such as competitors or criminals. Leakage of enterprise data can result both from intentional activity by unscrupulous employees, as well as unintentional but negligent actions of employees not following robust security procedures.

The problems inherent in Data Loss Protection ("DLP") are exacerbated by the rapidly expanding use of mobile computing. As it becomes ever more common for individuals to own and carry mobile computing devices such as smartphones and tablet computers, people want the freedom to use their own devices for work in addition to their personal use (this approach is sometimes called the bring-your-own-device model). Users are familiar and comfortable with their own devices, and do not want to learn how to operate and carry a second device for work. At the same time, enterprises have a legitimate need to control the handling of their confidential information when it is accessed and processed on non-enterprise devices.

Organizations lack visibility into the access and flow of sensitive documents and information in general, and by and across mobile devices in particular. Administrators lack tools for tracking data access and usage, much less detecting anomalous patterns. With the increasing prevalence of mobile computing and the so called bring-your-own-device policies, tracking the access and flow of enterprise data and preventing leakage are more difficult than ever. Yet, organizations rightly want to limit the access and use of confidential data according to an enterprise-level information control policy.

It would be desirable to address these issues.

SUMMARY

Access of enterprise data on multiple client computers is automatically monitored, so as to detect anomalous access activity and protect against leakage of enterprise data. Based on the monitoring, access of enterprise data on client computers is logged, and resulting log information is received from multiple client computers. The received log information identifies accessed units of enterprise data and access context on specific client computers. For example, log information describing access of enterprise data on a specific client computer can be in the form of a hash of the accessed data (or the data itself, depending on size) and information detailing the context in which the access of the specific unit of data occurred. Specific units of enterprise data can comprise, for example, files, specific sections of files, specific content located within one or more files, documents, specific sections of documents and/or specific content located within one or more documents. Specific content can be identified by, for example, an enterprise level administrator. Specific content to monitor can also be identified automatically, for example by scanning enterprise data accessed on client computers, identifying content in accessed units of enterprise data indicative of confidentiality and monitoring the identified content. Detected access of the identified content is then logged.

Received log information concerning access of specific units of enterprise data on multiple client computers over a period of time is amalgamated. Statistical analysis is performed on amalgamated log information received from multiple client computers (for example, on each specific accessed unit of enterprise data), thereby determining one or more access baselines for enterprise data over the period of time. Performing statistical analysis on amalgamated log information can take the form of tracking logged context information concerning access of a specific unit of enterprise data as received from multiple client computers over the period of time, and measuring corresponding patterns of access. Based on amalgamated log information concerning the access of a specific unit of enterprise data on multiple client computers over the period of time, baselines can be established such as a baseline concerning numbers of users that access the specific unit of enterprise data over the time period, a baseline concerning types of users that access the specific unit of enterprise data over the time period, a baseline concerning geographic locations from which the specific unit of enterprise data is accessed over the time period, a baseline concerning applications with which the specific unit of enterprise data is accessed over the time period, a baseline concerning computing devices on which the specific unit of enterprise data is accessed over the time period, and a baseline concerning a frequency at which the specific unit of enterprise data is accessed over the time period.

Access of enterprise data that is anomalous as measured against at least one determined baseline is detected. For example, received log information concerning access of a specific unit of enterprise data on a specific client computer is compared to one or more corresponding access baseline(s). Responsive to the comparison indicating that the access of the specific unit of data deviates from a baseline in excess of a predetermined threshold, the access is classified as being anomalous. The baseline in question from which the access of the specific unit deviates can be in the form of, for example, a baseline concerning numbers of users, specific users or types of users that access the specific unit of enterprise data, a baseline concerning geographic locations from which the specific unit of enterprise data is accessed, a baseline concerning types or specific applications with which the specific unit of enterprise data is accessed, a baseline concerning types or specific computing devices on which the specific unit of enterprise data is accessed or a baseline concerning a frequency at which the specific unit of enterprise data is accessed.

An alert is automatically output in response to detecting the anomalous access of enterprise data, for example to an enterprise level administrator via a user interface or electronic communication. In one embodiment, in response to receiving an indication from the administrator that the detected anomalous action is authorized, one or more corresponding baselines are updated accordingly. Reports documenting access activity of enterprise data on multiple client computers over time can be generated, based on amalgamated log information. For example, these reports can be in the form of graphical representations depicting access activity flow patterns of enterprise data on multiple client computers. Generated reports can be output, for example to an administrator via a user interface.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
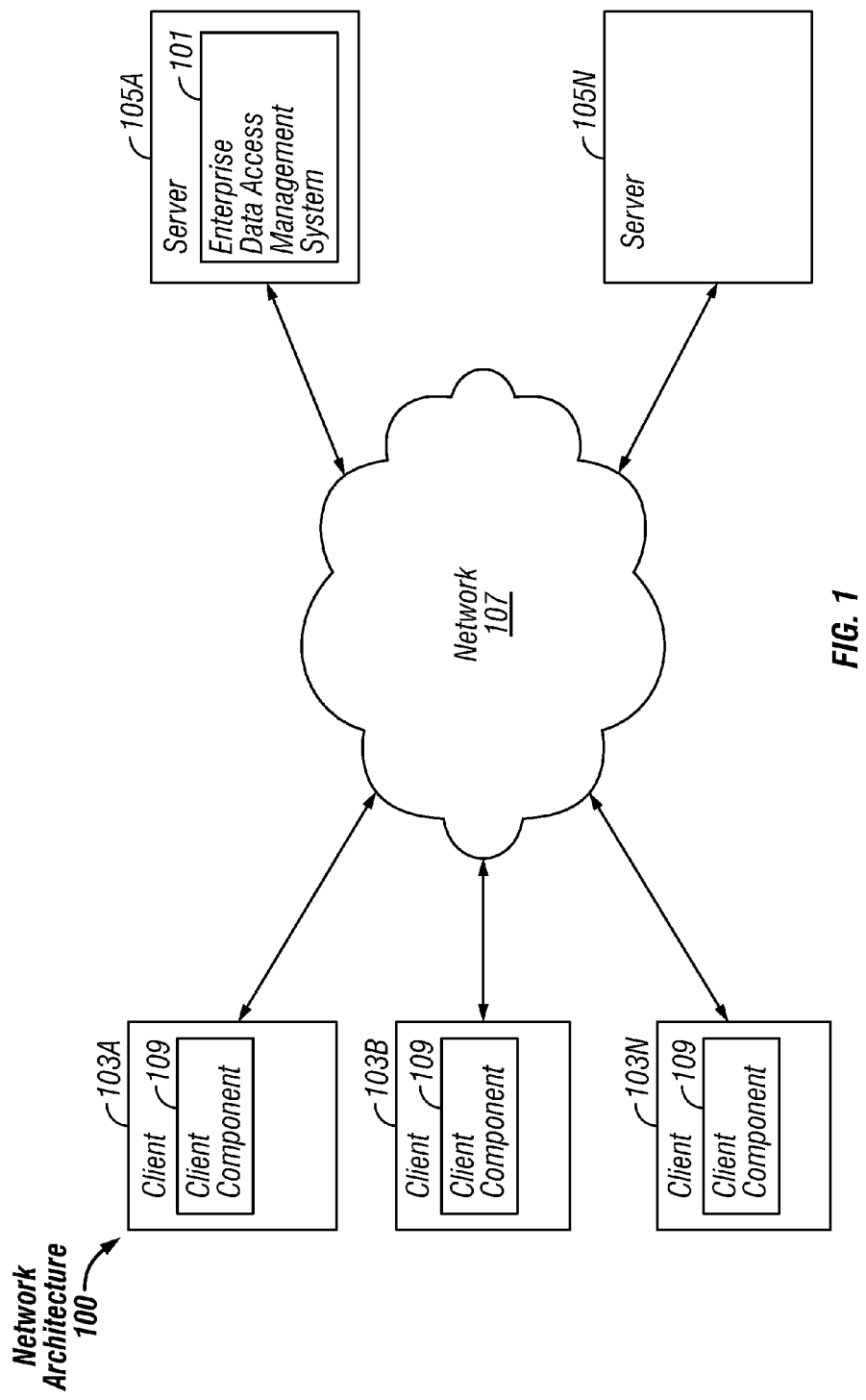
FIG. 1 is a block diagram of an exemplary network architecture in which an enterprise data access management system can be implemented, according to some embodiments.

FIG. 1 is a block diagram illustrating an exemplary network architecture 100 in which an enterprise data access management system 101 can be implemented. The illustrated network architecture 100 comprises multiple clients 103A, 103B and 103N, as well as multiple servers 105A and 105N. In FIG. 1, an enterprise data access management system 101 is illustrated as residing on server 105A, with a separate client component 109 on each client 103A-103N. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can be in the form of desktop computers, laptop computers, or mobile computing devices, comprising portable computer systems capable of connecting to a network 107 and running applications. Such mobile computing devices are sometimes referred to as smartphones, although some mobile phones not so designated also have these capabilities. Tablet computers are another example of mobile computing devices.

Although FIG. 1 illustrates three clients 103 and two servers 105 as an example, in practice many more (or fewer) clients 103 and/or servers 105 can be deployed. In one embodiment, the network 107 is in the form of the internet. Other networks 107 or network-based environments can be used in other embodiments.

Figure 2:
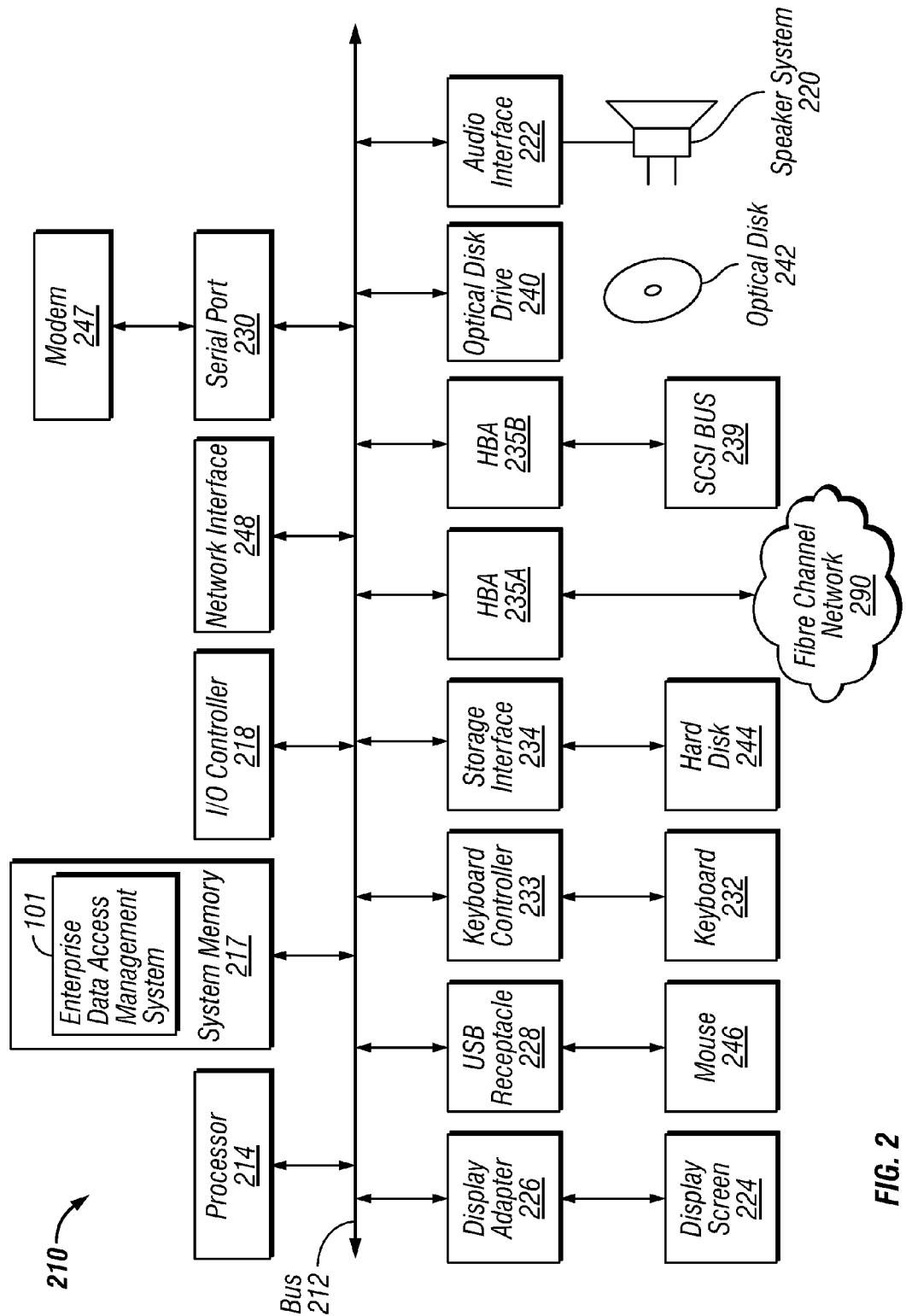
FIG. 2 is a block diagram of a computer system suitable for implementing an enterprise data access management system, according to some embodiments.

FIG. 2 is a block diagram of a computer system 210 suitable for implementing an enterprise data access management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) receptacles 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB receptacle 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices 307 via, e.g., USB receptacles 228). The various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the enterprise data access management system 101 is illustrated as residing in system memory 217. The workings of the enterprise data access management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and/or modem 247 can be directly or indirectly communicatively coupled to a network 107 such as the internet. Such coupling can be wired or wireless.

Figure 3:
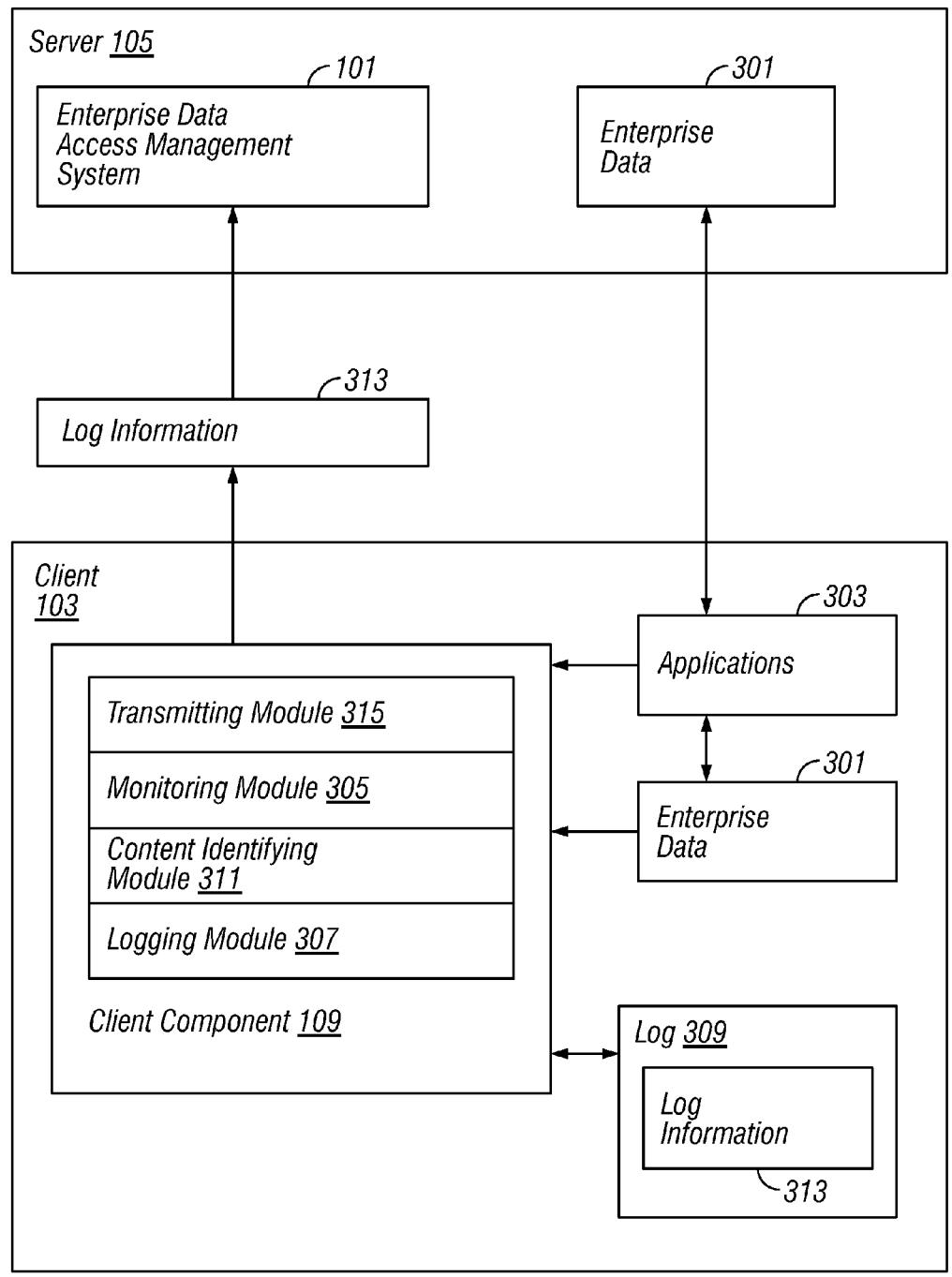
FIG. 3 is a block diagram of the operation of a client component of an enterprise data access management system, according to some embodiments.
Figure 4:
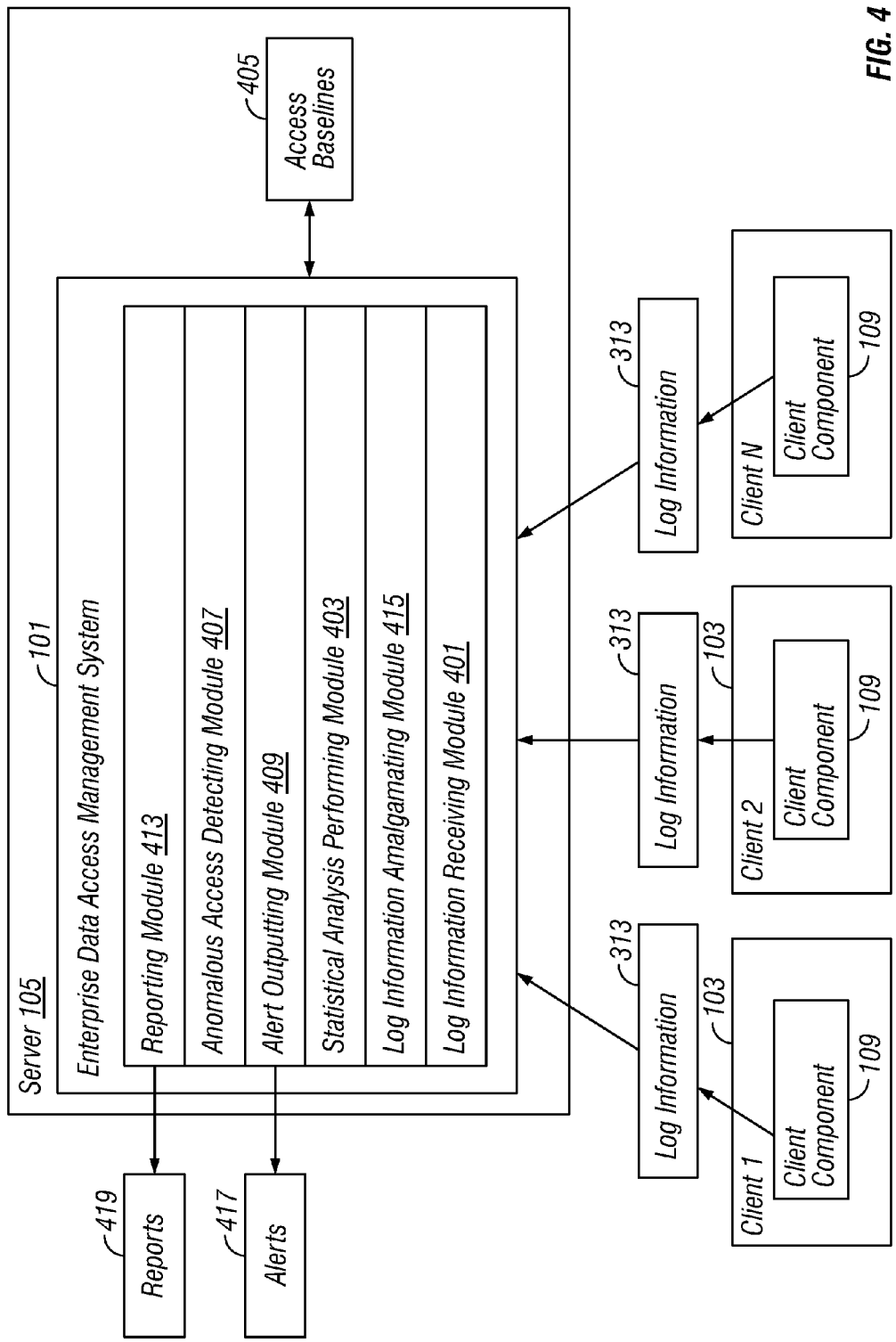
FIG. 4 is a block diagram of the operation of an enterprise data access management system, according to some embodiments.

FIG. 3 illustrates the operation of a client component 109 and FIG. 4 illustrates operation of an enterprise data access management system, according to some embodiments. As described above, the functionalities of the enterprise data access management system 101 can reside on a client 103, a server 105, or be distributed between multiple computer systems 210, including within a cloud-based computing environment in which the functionality of the enterprise data access management system 101 is provided as a service over a network 107. It is to be understood that although the client component 109 and enterprise data access management system 101 are illustrated in FIGS. 3 and 4 as separate entities, the illustrated client component 109 and enterprise data access management system 101 represent a collection of functionalities, which can be instantiated as a single or multiple modules as desired (instantiations of specific, multiple modules of the client component 109 and enterprise data access management system 101 are illustrated in FIGS. 3 and 4). It is to be understood that the modules of the client component 109 and enterprise data access management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the enterprise data access management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

The enterprise data access management system 101 automatically tracks the access and flow of enterprise data 301 over time across multiple devices, by various apps, between users and across geographic locations. Access of enterprise data 301 on multiple client computers 103 (including mobile devices) is monitored, logged and reported to the centralized enterprise data access management system 101. Anomalous access activity is detected and brought to the attention of an enterprise level administrator, such that data leakage can be managed and prevented. In addition to alerting the administrator concerning anomalous access, the enterprise data access management system 101 can also generate and present visualizations and custom reports detailing the flow and access of the enterprise data 301, providing the administrator with a robust tracking and management tool.

As illustrated in FIG. 3, a client component 109 of an enterprise data access management system 101 runs on a client computer 103 that remotely accesses an enterprise network 109. The client computer 103 can but need not be in the form of a mobile computing device such as a smartphone. The client component 109 monitors attempts by applications 303 on the client 103 to access centralized, enterprise data 301 within the enterprise network 107. As the term is used herein, an enterprise network 107 means a network 107 maintained by any type of organization (e.g., a corporation, a university, a government department, a municipality, a civic organization), wherein proprietary or other private data 301 is stored thereon, and access to the network 107 is restricted according to policies set by an administrator. For example, typically only authorized users (e.g., employees, students, members, etc.) are allowed to access the enterprise network 107. Each specific user's access to specific resources and data 301 within the network 107 can be further restricted according to an administrator set information control policy as appropriate. As "enterprise" is used herein, the term means any organization that makes its electronic data 301 available to individuals under its management according to an information control policy. Corporations, governments and universities are examples of enterprises.

A monitoring module 305 of the client component 109 monitors interaction with enterprise data 301 by the client computer 103. The exact interactions to monitor can vary between embodiments, but typically actions such as obtaining, opening, processing and sharing of enterprise data 301 by any application 303 on the client 109 are monitored. This monitoring can be implemented by intercepting or otherwise hooking system calls that perform functionality that can access enterprise data 301, and wrapping them with calls that execute the desired monitoring functionality. For example, calls that implement network communication can be intercepted, so as to detect and monitor remote access of the enterprise network 109, as well as attempts to transmit enterprise data 301 to a third party. Calls to access the file system (e.g., open, read, write, seek) can be intercepted, to detect and monitor client level interaction with local copies of enterprise data 301 (e.g., copies of enterprise files synchronized or otherwise downloaded to the client computer 109). Inter-process communication can also be hooked, in order to detect and monitor copying, pasting, sharing or otherwise manipulating enterprise data 301 between applications 303. The exact functionality to monitor, and hence the specific system calls to intercept, can vary between embodiments. The implementation mechanics of system call interception varies between operating systems. For example, under Windows interception can be implemented by using dynamic link library (DLL) injection or a kernel level filter driver. Under iOS the interceptions occur at runtime. Under Android, the code is disassembled, modified, added to, and re-assembled.

In some embodiments, the client component 109 of the enterprise data access management system 101 is instantiated in conjunction with another software product. For example, on a mobile computing device, the client component 109 can be integrated with a mobile application management system, which allows an administrator to define policies that control factors such as connectivity, user authentication, encrypted storage, open-in, copy-paste between groups of apps, etc. In a desktop environment, the client component 109 can be integrated with security software, such as an anti-malware program. These are just examples of software with which the client component can be integrated. In general, the client component 109 can be integrated with any software platform that performs some form of data filtering at a logical enforcement point for enterprise data 301 management (another example of such an enforcement point is an email or other gateway). In other embodiments, the client component 109 is implemented as a standalone product.

A logging module 307 of the client component 109 maintains a log 309 of what enterprise data 301 is accessed on the client 109, and in what context. This can take the form of logging hashes of enterprise data 301 accessed or otherwise processed on the client, along with context information concerning the specific interaction with the enterprise data 301, such as the time, location, user, app, device-id, etc. The specific context information to log is a variable design parameter. When enterprise data 301 is processed at a file or document level, the logging module 307 typically takes and logs a hash of the accessed enterprise data 301, as opposed to logging entire files. Where enterprise data 301 is accessed in smaller units such as particular expressions or identifiers of interest as discussed below, it can be more efficient to log the actual data 301 as opposed to its hash.

The level at which to monitor and log enterprise data 301 can vary according to embodiments and circumstances. For example, the enterprise data 301 can be processed at a file level (e.g., specific file opened or modified), according to the specific data within one or more files that is accessed (e.g., specific text written to or copied from a file), or at finer content specific levels of granularity, such as specific content or sections of documents that are identified programmatically or by an administrator as being confidential or otherwise sensitive. Thus, in some embodiments, when a subsection of an enterprise file is accessed, instead of taking and logging a hash of the entire document a hash of just the accessed content (or the content itself depending on its size) can be logged.

Furthermore, in some embodiments accessed documents are scanned to identify specific content, and if present the access of the specific content is monitored and logged. The specific content can be at the level of particular content and/or categories of information which an administrator explicitly indicates as being confidential or sensitive. In addition and/or instead of identifying specific content or categories flagged by an administrator, the enterprise data access management system 101 can scan accessed enterprise files for regular expressions or other alpha-numeric patterns associated with categories of information considered confidential or otherwise sensitive.

For example, a content identifying module 311 of the data access management system 101 can automatically identify elements in enterprise documents which are considered to be confidential, such as social security numbers or bank account numbers. The content identifying module 311 can parse each document, and identify textual elements (e.g., words, alpha-numeric representations of numbers, punctuation, etc.). The content identifying module 311 can also identify non textual elements in documents, such as layout information and graphical features. It is to be understood that as the term is used herein, a "document" can be in any computer format (e.g., doc, txt, xls, html, rtf, etc.), including non-textual image based formats, such as pdf or jpg. When processing image based formats, optical character recognition (OCR) can be performed to convert images of text into text, so that textual elements can be identified in the image data. For example, OCR can be used to convert a pdf file resulting from scanning printed pages of text into a doc or txt file. The content identifying module 311 can then identify content in enterprise documents that meets given criteria indicating a confidential category, such as the format of a social security number (i.e., three digits, a hyphen, two digits, a second hyphen, three digits) or credit card number. The identified content is then monitored, and any access of the identified content is logged (for example by logging the accessed content itself and the contextual information concerning the monitored access).

The hashes of accessed/processed enterprise documents/data 301 (or other representations and/or the content itself) and the corresponding context information are stored in the log 309. A transmitting module 315 of the client component 109 periodically transmits the log information 313 to the enterprise data access management system 101 on the server 105. As described in detail below, the server side enterprise data access management system 101 receives log information 313 from many separate client computers 103, and is thus able to identify access patterns, track the flow and manage leakage of enterprise data 301.

FIG. 4 illustrates an enterprise data access management system 101 running on a server computer 105. As illustrated, a log information receiving module 401 of the enterprise data access management system on the server 105 receives log information 313 (e.g., hashes of accessed enterprise data 301 and corresponding context information) from multiple clients 103 over a network 107 (e.g., the internet). For purposes of illustration, only three clients 103 are depicted in FIG. 4. It is to be understood that in practice the server side enterprise data access management system 101 would typically receive log information 313 from a much larger number of clients 103, for example hundreds, thousands or tens of thousands of clients 103.

A log information amalgamating module 415 of the enterprise data access management system 101 amalgamates received log information 313 concerning access of specific units of enterprise data 301 on multiple client computers 103 over a period of time. A statistical analysis performing module 403 of the enterprise data access management system 101 performs statistical analysis on amalgamated log information 313 received from multiple clients 103, and determines one or more access baselines 405 for the enterprise data 301 over time. The given period(s) of time to track are a variable design parameter. The exact baselines 405 to determine as well as the specific statistical methodology used to do so are also design parameters which can vary between embodiments.

In general, for each specific unit of enterprise data 301 (e.g., each file as identified by its hash), the statistical analysis performing module tracks the appropriate corresponding context information as received from multiple clients 103 over a given period of time, in order to measure access patterns and establish baselines 405, such as which user(s) access the specific enterprise data 301, from what location(s) the enterprise data 301 is accessed, when the enterprise data is accessed, from which type(s) of devices and from which specific device(s), for how long, using which types of app(s), from which specific app(s), in what manner the data 301 is shared, copied, moved, transmitted, etc.

The specific access criteria that are measured and the time periods and levels of granularity utilized to determine baselines 405 can vary between embodiments as desired. For any given unit (and/or type or category, etc.) of enterprise data 301, based on amalgamated log information concerning its access on multiple client computers 103 over a period of time, baselines 405 can be established for access patterns such as how many and what types of users access the given piece of enterprise data 301 over the given period of time, from which specific geographic locations, using which sets of apps and devices, at what frequency, etc. By establishing the stable average background scatter to enterprise data 301 access patterns, the enterprise data access management system 101 is able to detect subsequent anomalous access thereof, as described below.

A anomalous access detecting module 407 of the enterprise data access management system 101 detects anomalous access of enterprise data 301, as measured against the established baselines 405. More specifically, when incoming log information 313 concerning access of a given unit of enterprise data 301 on a specific client computer 103 is received, the instance and context of the access as documented by the log information 313 are compared to corresponding access baselines 405. Where the comparison indicates that the enterprise data 301 is being accessed in a manner outside of what is expected based on empirically determined access patterns, the anomalous access detecting module 407 interprets this activity as anomalous. In other words, when a given unit of enterprise data 301 is accessed by a specific user (or type of user), app and/or device (or from a given location, at a specific frequency, etc.) that is unexpected based on established baselines 405, the activity is flagged as an anomaly.

For example, if a given document that is historically downloaded only by managers located in a company's New York office is read by a salesperson located in Michigan, the salesperson's read of the document can be flagged as an anomalous action because it is unexpected relative to the established baseline 405, both in terms of type of user and location. Likewise, sharing, copying, pasting, emailing or otherwise transmitting a given unit of enterprise data 301 to an unexpected destination can also be so detected. For example, suppose that in a given enterprise environment an access baseline 405 indicates that employee's social security numbers are stored in employee profiles, which are accessed only by human resource personnel and pasted only into tax documents which are provided only to the IRS. If a given individual in human resources starts pasting employee's social security numbers from employee profile records into a local spreadsheet, this action could be flagged as anomalous because these units of confidential enterprise data 301 are not typically pasted into such targets. The subsequent emailing of the spreadsheet containing the social security numbers to Russia could then be flagged as well, because Russia is not an empirically observed target for this specific type of enterprise data 301.

The specific criteria and thresholds used to classify as anomalous access activity that differs from established patterns are variable design parameters. Thus, differing threshold amounts of deviation from the baseline 405 can be required before such a classification is made, depending on both the nature of the access activity and the level of variation from historical patterns considered tolerable without raising an alert. In some embodiments, specific criteria and/or actions that deviate from baselines 405 are weighted in the determination of whether an given access activity is considered anomalous. For example, access of specific content (e.g., a particular memorandum) or specific types of content (e.g., financial data) can be weighted more heavily than other enterprise data 301. The same is true for specific accessing users, apps, devices, source and target locations, etc. Default parameters and thresholds defining alerting conditions can be provided by the enterprise data access management system 101, and typically these values can be set or edited by an administrator to configure the enterprise data access management system as desired.

Responsive to detecting anomalous access, an alert outputting module 409 of the enterprise data access management system 101 automatically outputs an alert 417 that documents the detected anomalous access activity. For example, the alert 417 can be output to an administrator, e.g., through a user interface and/or electronic communication such as a text message or email. The administrator can then take responsive action as desired, for example by reconfiguring permissions to prevent the anomalous access from reoccurring, investigating the anomalous access or alerting the appropriate personnel within the enterprise, etc. In some embodiments, in response to the administrator indicating that the anomalous access is authorized, the enterprise data access management system 101 updates the corresponding baseline(s) 405 to account for this, so as not to flag the same action in the future. In some embodiments, the enterprise data access management system 101 can automatically take additional actions in response to detecting anomalous access activity, such as blocking the access attempt or the like.

In addition to providing alerts of detected anomalous access activity, a reporting module 413 of the enterprise data access management system 101 can generate and present graphical representations and other reports 419 not only of detected access anomalies, but also documenting access activity patterns generally (e.g., access activity of enterprise data on multiple ones of the client computers 103 over time). For example, based on amalgamated log information 313 received from multiple client computers 103, the visualization presenting module 413 can generate graphs and other visualizations depicting the access and flow patterns of enterprise data 301 across time, by user, location, app, device, and/or any other type of reported context information. In addition to being alerted when anomalous access activity occurs, it is beneficial for an administrator to have information concerning where, when, how often, for how long, by whom, etc., given pieces of enterprise data 301 are being accessed. The visualization presenting module 413 can generate and present such visualizations of enterprise data 301 access and flow activity. Typically, the visualization presenting module 413 can generate and present various default graphical (and/or textual) reports 419, and also supports configuration of customized reports 419 according to administrator defined parameters and criteria, as specified through the user interface (or otherwise as desired, for example through a configuration file).

Figure 5:
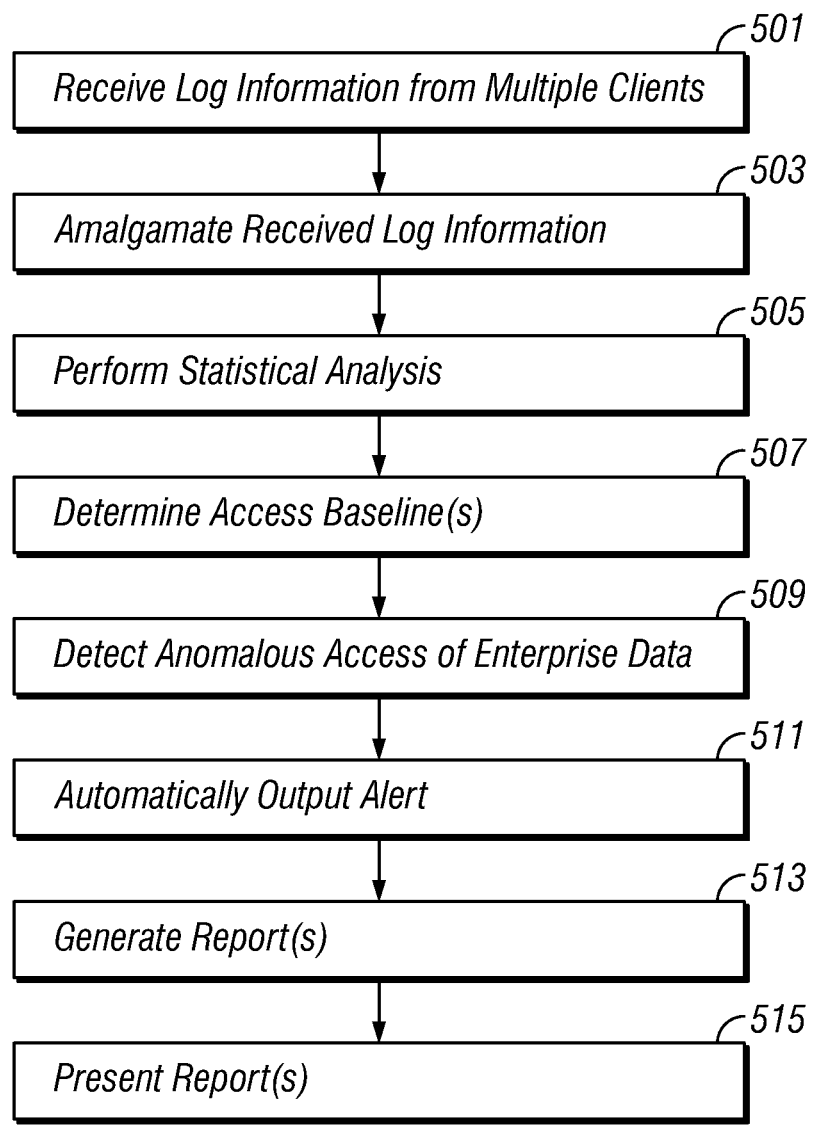
FIG. 5 is a flowchart of the operation of an enterprise data access management system, according to some embodiments.

FIG. 5 illustrates steps of the operation of an enterprise data access management system 101, according to some embodiments. The log information receiving module 401 receives 501 log information 313 from multiple clients 103. The log information amalgamating module 415 amalgamates 503 received log information 313 concerning access of specific units of enterprise data 301 on multiple client computers 103 over a period of time. The statistical analysis performing module 403 performs 505 statistical analysis on amalgamated log information 313 received from multiple clients 103, and determines 507 one or more access baselines 405 for the enterprise data 301 over the time period. The anomalous access detecting module 407 detects 509 access of enterprise data 301 that is anomalous, as measured against at least one established baseline 405. The alert outputting module 409 automatically outputs 511 an alert 417 that documents anomalous access activity, in responsive to detecting the anomalous access. The reporting module 413 generates 513 and presents 515 reports 419 documenting access activity of enterprise data 301 on multiple ones of the client computers 103 over time, based on amalgamated log information 313.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for automatically monitoring access of enterprise data on a plurality of client computers, thereby detecting anomalous access activity and protecting against leakage of enterprise data, the method comprising the steps of:
   receiving log information from multiple ones of the plurality of client computers, log information received from a specific client computer identifying specific units of enterprise data accessed on the specific client computer and information concerning context in which the specific units were accessed;
   amalgamating received log information concerning access of specific units of enterprise data on multiple client computers over a period of time;
   performing statistical analysis on amalgamated log information received from multiple client computers and concerning access of specific units of enterprise data on multiple computers over time, thereby determining at least one access baseline concerning access of specific units of enterprise data on multiple computers over time for enterprise data over the period of time, by the computer,
   wherein the at least one baseline concerns geographic locations from which a specific unit of enterprise data is accessed over the period of time, based on amalgamated log information concerning access of the specific unit of enterprise data on multiple client computers;
   detecting an anomalous access of enterprise data as measured against at least one determined access baseline; and
   automatically outputting an alert documenting the detected anomalous access in response to detecting the anomalous access of enterprise data.

2. The method of claim 1 wherein performing statistical analysis on amalgamated log information received from multiple client computers further comprises:
   performing statistical analysis on amalgamated log information concerning each specific unit of enterprise data.

3. The method of claim 1 wherein performing statistical analysis on amalgamated log information received from multiple client computers further comprises:
   tracking logged context information concerning access of a specific unit of enterprise data as received from multiple client computers over the period of time; and
   measuring patterns of access of the specific unit of enterprise data on the multiple client computers over the period of time.

4. The method of claim 1 wherein determining at least one access baseline for enterprise data further comprises:
   establishing a baseline concerning numbers of users that access a specific unit of enterprise data over the period of time, based on amalgamated log information concerning access of the specific unit of enterprise data on multiple client computers.

5. The method of claim 1 wherein determining at least one access baseline for enterprise data further comprises:
   establishing a baseline concerning types of users that access a specific unit of enterprise data over the period of time, based on amalgamated log information concerning access of the specific unit of enterprise data on multiple client computers.

6. The method of claim 1 wherein determining at least one access baseline for enterprise data further comprises:
   establishing a baseline concerning applications with which a specific unit of enterprise data is accessed over the period of time, based on amalgamated log information concerning access of the specific unit of enterprise data on multiple client computers.

7. The method of claim 1 wherein determining at least one access baseline for enterprise data further comprises:
   establishing a baseline concerning computing devices on which a specific unit of enterprise data is accessed over the period of time, based on amalgamated log information concerning access of the specific unit of enterprise data on multiple client computers.

8. The method of claim 1 wherein determining at least one access baseline for enterprise data further comprises:
   establishing a baseline concerning a frequency at which a specific unit of enterprise data is accessed over the period of time, based on amalgamated log information concerning access of the specific unit of enterprise data on multiple client computers.

9. The method of claim 1 wherein detecting an anomalous access of enterprise data as measured against at least one determined access baseline further comprises:
   receiving log information concerning access of a specific unit of enterprise data on a specific client computer;
   comparing the received log information to at least one corresponding access baseline; and
   responsive to the comparison indicating that the access of the specific unit of data deviates from the baseline in excess of a predetermined threshold, classifying the access as being anomalous.

10. The method of claim 1 wherein detecting an anomalous access of enterprise data as measured against at least one determined access baseline further comprises:
    classifying an access of a specific unit of enterprise data on a specific client computer as being anomalous based on the access of the specific unit of data deviating from at least one baseline in excess of a predetermined threshold, wherein the at least one baseline is from a group consisting of:
    a baseline concerning numbers of users that access the specific unit of enterprise data;
    a baseline concerning specific users that access the specific unit of enterprise data;
    a baseline concerning types of users that access the specific unit of enterprise data;
    a baseline concerning geographic locations from which the specific unit of enterprise data is accessed;
    a baseline concerning specific applications with which the specific unit of enterprise data is accessed;
    a baseline concerning types of applications with which the specific unit of enterprise data is accessed;
    a baseline concerning specific computing devices on which the specific unit of enterprise data is accessed;
    a baseline concerning types of computing devices on which the specific unit of enterprise data is accessed; and
    a baseline concerning a frequency at which the specific unit of enterprise data is accessed.

11. The method of claim 1 further comprising:
    receiving an indication the detected anomalous action is authorized; and
    in response to the received indication, updating at least one corresponding baseline accordingly.

12. The method of claim 1 further comprising:
generating at least one report documenting access activity of enterprise data on multiple ones of the client computers over time, based on amalgamated log information; and
outputting the at least one generated report.

13. The method of claim 12 wherein generating at least one report documenting access activity of enterprise data on multiple ones of the client computers over time further comprises:
generating at least one graphical representation depicting access activity flow patterns of enterprise data on multiple ones of the client computers over time, based on amalgamated log information; and
outputting the at least one generated graphical representation.

14. The method of claim 1 wherein specific units of enterprise data further comprise units of enterprise data from a group consisting of:
files, specific sections of files, specific content located within at least one file, documents, specific sections of documents and specific content located within at least one document.

15. The method of claim 1 wherein receiving log information from multiple ones of the plurality of client computers further comprises:
receiving information logged in response to monitoring access of enterprise data on client computers.

16. The method of claim 15 wherein monitoring access of enterprise data on client computers further comprises:
scanning units of enterprise data accessed on client computers;
identifying content in specific units of enterprise data accessed on client computers indicative of confidentiality;
monitoring identified content in specific units of enterprise data; and
responsive to detecting access of identified content, logging the detected access.

17. The method of claim 15 wherein received log information further comprises:
i) enterprise data accessed on client computers or hashes of accessed enterprise data and ii) context information concerning monitored accesses of enterprise data on client computers.

18. At least one non-transitory computer readable-storage medium for automatically monitoring access of enterprise data on a plurality of client computers, thereby detecting anomalous access activity and protecting against leakage of enterprise data, the at least one non-transitory computer readable-storage medium storing computer executable instructions that, when loaded into computer memory and executed by at least one processor of a computing device, cause the computing device to perform the following steps:
receiving log information from multiple ones of the plurality of client computers, log information received from a specific client computer identifying specific units of enterprise data accessed on the specific client computer and information concerning context in which the specific units were accessed;
amalgamating received log information concerning access of specific units of enterprise data on multiple client computers over a period of time;
performing statistical analysis on amalgamated log information received from multiple client computers and concerning access of specific units of enterprise data on multiple computers over time, thereby determining at least one access baseline concerning access of specific units of enterprise data on multiple computers over time for enterprise data over the period of time, by the computer,
wherein the at least one baseline concerns geographic locations from which a specific unit of enterprise data is accessed over the period of time, based on amalgamated log information concerning access of the specific unit of enterprise data on multiple client computers;
detecting an anomalous access of enterprise data as measured against at least one determined access baseline; and
automatically outputting an alert documenting the detected anomalous access in response to detecting the anomalous access of enterprise data.

19. A computer system for automatically monitoring access of enterprise data on a plurality of client computers, thereby detecting anomalous access activity and protecting against leakage of enterprise data, the computer system comprising:
at least one processor;
system memory;
a log information receiving module residing in the system memory, the log information receiving module being programmed to receive log information from multiple ones of the plurality of client computers, log information received from a specific client computer identifying specific units of enterprise data accessed on the specific client computer and information concerning context in which the specific units were accessed;
a log information amalgamating module residing in the system memory, the log information amalgamating module being programmed to amalgamate received log information concerning access of specific units of enterprise data on multiple client computers over a period of time;
a statistical analysis performing module residing in the system memory, the statistical analysis performing module being programmed to perform statistical analysis on amalgamated log information received from multiple client computers and concerning access of specific units of enterprise data on multiple computers over time, thereby determining at least one access baseline concerning access of specific units of enterprise data on multiple computers over time for enterprise data over the period of time, thereby determining at least one access baseline for enterprise data over the period of time;
statistical analysis on amalgamated log information received from multiple client computers and concerning access of specific units of enterprise data on multiple computers over time, thereby determining at least one access baseline concerning access of specific units of enterprise data on multiple computers over time for enterprise data over the period of time;
a baseline establishment module residing in the system memory, the baseline establishment module being programmed to establish a baseline concerning geographic locations from which a specific unit of enterprise data is accessed over the period of time, based on amalgamated log information concerning access of the specific unit of enterprise data on multiple client computers
an anomalous access detecting module residing in the system memory, the anomalous access detecting module being programmed to detect anomalous access of enterprise data as measured against at least one determined access baseline; and an alert outputting module residing in the system memory, the alert outputting module being programmed to output an alert documenting the detected anomalous access automatically, in response to detecting the anomalous access of enterprise data.

\* \* \* \* \*